(12) United States Patent
Chiu et al.

(10) Patent No.: US 10,606,778 B2
(45) Date of Patent: Mar. 31, 2020

(54) BUS SYSTEM

(71) Applicant: Nuvoton Technology Corporation, Hsinchu (TW)

(72) Inventors: Chun-Wei Chiu, Hsinchu (TW); Chia-Ching Lu, Hsinchu (TW); Shih-Feng Huang, Hsinchu (TW); Ming-Che Hung, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 181 days.

(21) Appl. No.: 15/147,896

(22) Filed: May 5, 2016

(65) Prior Publication Data

US 2017/0153997 A1    Jun. 1, 2017

(30) Foreign Application Priority Data

Nov. 26, 2015    (TW) .............................. 104139444 A

(51) Int. Cl.
*G06F 13/364*    (2006.01)
*G06F 13/16*    (2006.01)
*G06F 13/40*    (2006.01)
*G06F 13/42*    (2006.01)

(52) U.S. Cl.
CPC ........ *G06F 13/364* (2013.01); *G06F 13/1642* (2013.01); *G06F 13/404* (2013.01); *G06F 13/4022* (2013.01); *G06F 13/4068* (2013.01); *G06F 13/4282* (2013.01)

(58) Field of Classification Search
CPC ............... G06F 13/364; G06F 13/1642; G06F 13/4022; G06F 13/404; G06F 13/4068; G06F 13/4282
See application file for complete search history.

(56) References Cited

U.S. PATENT DOCUMENTS

| | | | |
|---|---|---|---|
| 6,954,821 B2 | 10/2005 | Fitzsimmons et al. | |
| 8,433,838 B2 | 4/2013 | Crockett et al. | |
| 9,015,394 B2 | 4/2015 | DeCesaris et al. | |
| 9,152,598 B2 | 10/2015 | Fosse et al. | |
| 2004/0093450 A1* | 5/2004 | Andreas ............... | G06F 13/4291 710/110 |
| 2005/0060455 A1* | 3/2005 | Murdock ............ | G06F 13/4022 710/240 |
| 2006/0036704 A1* | 2/2006 | Kanekawa .......... | G06F 13/4217 709/208 |
| 2008/0183928 A1* | 7/2008 | Devila ................ | G06F 13/4291 710/110 |
| 2008/0270654 A1* | 10/2008 | Reberga .............. | G06F 13/4282 710/110 |

(Continued)

FOREIGN PATENT DOCUMENTS

TW    I311712 B    7/2009

*Primary Examiner* — Tim T Vo
*Assistant Examiner* — Harry Z Wang
(74) *Attorney, Agent, or Firm* — CKC & Partners Co., LLC

(57) ABSTRACT

A bus system is provided. The bus system includes a master device, a bus and a plurality of slave devices. The slave devices and the master device are electrically connected through the bus. The master device communicates with the slave devices by using a one-to-one communication mechanism. The slave devices communicate with the master device by using an arbitration mechanism in which one of the slave devices is selected to communicate with the master device.

15 Claims, 8 Drawing Sheets

(56) References Cited

U.S. PATENT DOCUMENTS

| | | | |
|---|---|---|---|
| 2011/0078350 A1* | 3/2011 | Carls | G06F 1/04 |
| | | | 710/110 |
| 2012/0072629 A1* | 3/2012 | Tokuda | G06F 13/364 |
| | | | 710/110 |
| 2012/0254600 A1* | 10/2012 | Fujimoto | G06F 9/4405 |
| | | | 713/1 |
| 2012/0272088 A1* | 10/2012 | Lee | G06F 1/324 |
| | | | 713/501 |
| 2014/0052881 A1* | 2/2014 | Alley | G06F 13/4291 |
| | | | 710/110 |
| 2015/0254198 A1* | 9/2015 | Anderson | G06F 13/364 |
| | | | 710/110 |
| 2016/0004526 A1* | 1/2016 | Hsu | G06F 8/654 |
| | | | 713/100 |
| 2016/0246612 A1* | 8/2016 | Jau | G06F 8/654 |

* cited by examiner

BUS SYSTEM

RELATED APPLICATIONS

This application claims priority to Taiwanese Application Serial Number 104139444, filed Nov. 26, 2015, which is herein incorporated by reference.

BACKGROUND

Field of Invention

The present invention relates to a data transmission technology. More particularly, the present invention relates to a bus system.

Description of Related Art

In a conventional computer system, the chip set, such as a south bridge chip, is electrically connected to the other external circuit module (such as a system-on-a-chip (SoC) with various functions) through a low pin count (LPC) interface. The external circuit modules coupled through the LPC interface are assigned to different and independent addresses respectively. As a result, the south bridge chip can perform communication with the external circuit modules by a one-to-many way. However, in, recent years, part of new bus architectures, such as an enhanced serial peripheral interface (eSPI) bus only allows a one-to-one communication mechanism being performed between the chip set and the external circuit modules. Under such a condition, the expandability of the bus system is restricted.

Accordingly, what is needed is an improved bus system to address the above issues.

SUMMARY

An aspect of the present disclosure is to provide a bus system. The bus system includes a master device, a bus and a plurality of slave devices. The slave devices and the master device are electrically connected through the bus. The master device communicates with the slave devices by using a one-to-one communication mechanism. The slave devices communicate with the master device by using an arbitration mechanism in which one of the slave devices is selected to communicate with the master device.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
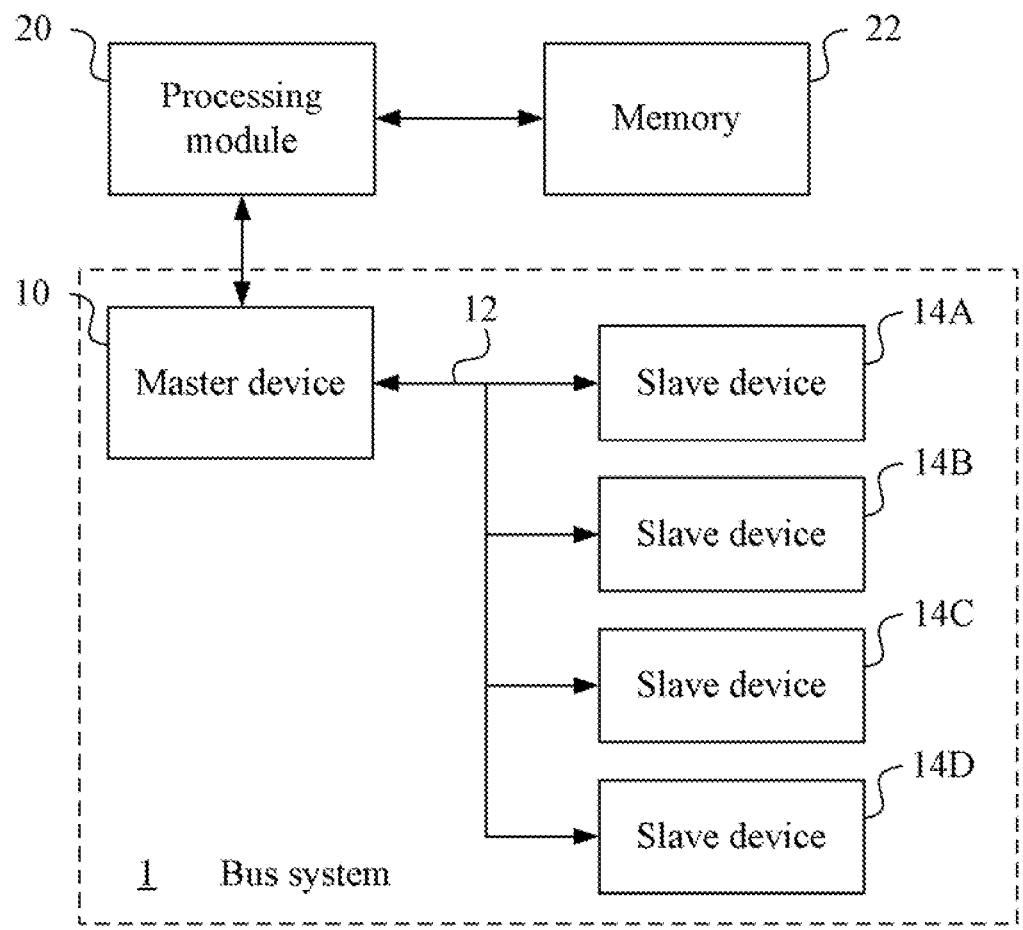
FIG. 1 is a block diagram of a bus system in an embodiment of the present disclosure.

Reference will now be made in detail to the present embodiments of the invention, examples of which are illustrated in the accompanying, drawings. Wherever possible, the same reference numbers are used in the drawings and the description to refer to the same or like parts.

Figure 2:
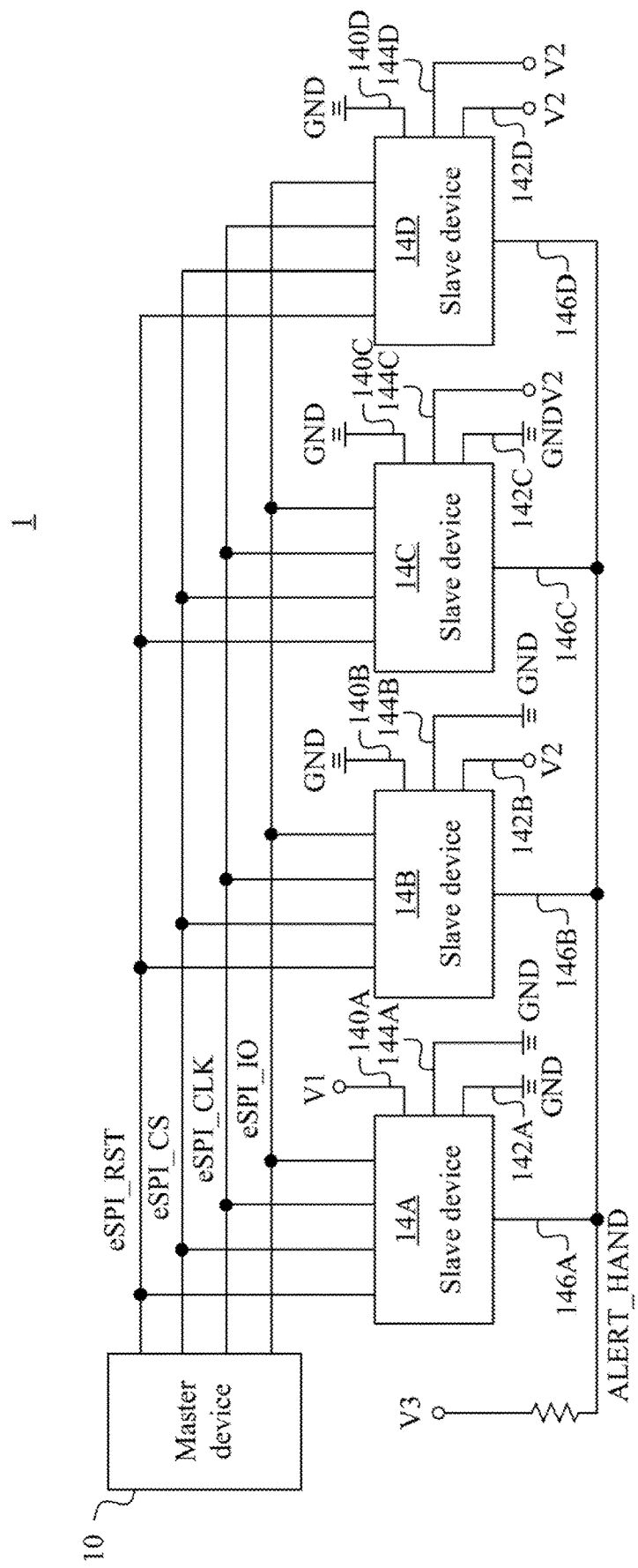
FIG. 2 is a more detailed diagram of the bus system in an embodiment of the present disclosure.

Reference is now made to FIG. 1 and FIG. 2 at the same time. FIG. 1 is a block diagram of a bus system 1 in an embodiment of the present disclosure. The bus system 1 includes a master device 10, a bus 12 and a plurality of slave devices 14A-14D. FIG. 2 is a more detailed diagram of the bus system 1 in an embodiment of the present disclosure.

In an embodiment, the master device 10 can be such as, but not limited to a south bridge chip. In an embodiment, the master device 10 can be electrically connected to a processing module 20 of a computer system (not illustrated) to perform data access with peripheral components through various kinds of buses according to the commands of the processing module 20, such as but not limited to perform the data access with the slave devices 14A-14D through the bus 12. In an embodiment, the processing module 20 is further electrically connected to a memory 22 of the computer system to access the memory 22 according to the needs of different application programs.

In an embodiment, the bus 12 is such as, but not limited to an eSPI bus. The slave devices 14A-14D and the master device 12 are electrically connected through the bus 12. In an embodiment, the master device 10 communicates with the slave devices 14A-14D by using a one-to-one communication mechanism. The slave devices 14A-14D communicate with the master device 10 by using an arbitration mechanism.

In an embodiment, the bus 12 includes a reset signal line eSPI_RST, a chip select signal line eSPI_CS, a clock signal eSPI_CLK and an input and output signal line eSPI_IO. The communication performed by the master device 10 through the bus 12 is based on the clock signal eSPI_CLK. The master device 10 selects one of the slave devices 14A-14D by using the chip select signal line eSPI_CS to perform communication with the one-to-one mechanism. The slave devices 14A-14D perform communication with the master device 10 by using the input and output signal line eSPI_IO with the arbitration mechanism.

In general, according to the operation mechanism of the chip select signal line eSPI_CS, the master device 10 can only select one device to perform communication. However, by using the arbitration mechanism, one of the slave devices 14A-14D can be selected to perform response to the master device 10 in a single time. As a result, though the master device 10 still operates by using the one-to-one communication mechanism, the bus 12 can use the single chip select signal line eSPI_CS to connect a multiple of slave devices 14A-14D to perform communication, so as to increase the expandability of the bus system 1.

Detail description of the embodiments of the communication performed between the master device 10 and the slave devices 14A-14D is made in the following paragraphs.

In an embodiment, the slave devices 14A-14D include only one primary slave device and other secondary slave devices. As illustrated in FIG. 2, each of the slave devices 14A-14D includes a primary and secondary determination pin 140A-140D. The primary and secondary determination pin 140A receives a first level voltage, such as but not limited to a voltage V1. As a result, the slave device 14A, of which the primary and secondary determination pin 140A receives the voltage V1, is set to be the primary slave device. Each of the primary and secondary determination pins 140B-140D receives a second level voltage different from the first level voltage, such as but not limited to a ground voltage GND. As a result, the slave devices 14B-14D, of which the primary and secondary determination pins 140B-140D receive ground voltage GND, are set to be the secondary slave devices.

It is appreciated that in different embodiments, any of the slave devices can be set to receive the first level voltage according to the need of the user and become the primary slave device. In other words, the slave device 14A is not necessarily set to be the primary slave device. Further, in other embodiments, other methods implemented by using hardware or software can be used to determine the primary and secondary slave devices according to the design of the user.

As illustrated in FIG. 2, each of the slave devices 14A-14D further includes an address section selection pin 142A-142D, an address entry selection pin 144A-144D and an alert handshake pin 146A-146D.

The addresses that the slave devices 14A-14D correspond thereto can be assigned according to a combination of the voltage level received by the address section selection pins 142A-142D and the address entry selection pins 144A-144D of the slave devices 14A-14D. The slave devices 14A-14D can thus have address sections different from each other.

Taking the embodiment illustrated in FIG. 2 as an example, the address section selection pins 142A and 142C receive the ground voltage GND to correspond to such as, but not limited to the address section 2E. The address section selection pins 142B and 142D receive the voltage V2 to correspond to such as, but not limited to the address section 4E.

Moreover, the address entry selection pins 144A and 144C respectively receive the ground voltage GND and the voltage V2 to correspond to different address entry codes, such as but not limited to 87h and 88h corresponding to the address section 2E. The address entry selection pins 144B and 144D respectively receive the ground voltage GND and the voltage V2 to correspond to different address entry codes, such as but not limited to 87h and 88h corresponding to the address section 4E.

The alert handshake pins 146A-146D are electrically connected to an alert handshake control line ALERT_HAND In the present embodiment, the alert handshake control line ALERT_HAND is electrically connected to a voltage V3 which is a first level voltage and a high voltage level Any one of the slave devices 14A-14D can pull low the voltage level of the alert handshake control line ALERT_HAND by pulling the alert handshake pins 146A-146D thereof to a second level voltage, which is a love voltage level compared with the first level voltage. In some embodiments, one of the slave devices 14A-14D is authorized to actively communicate with the master device 10 by controlling the voltage level of the alert handshake control line ALERT_HAND.

Figure 3:
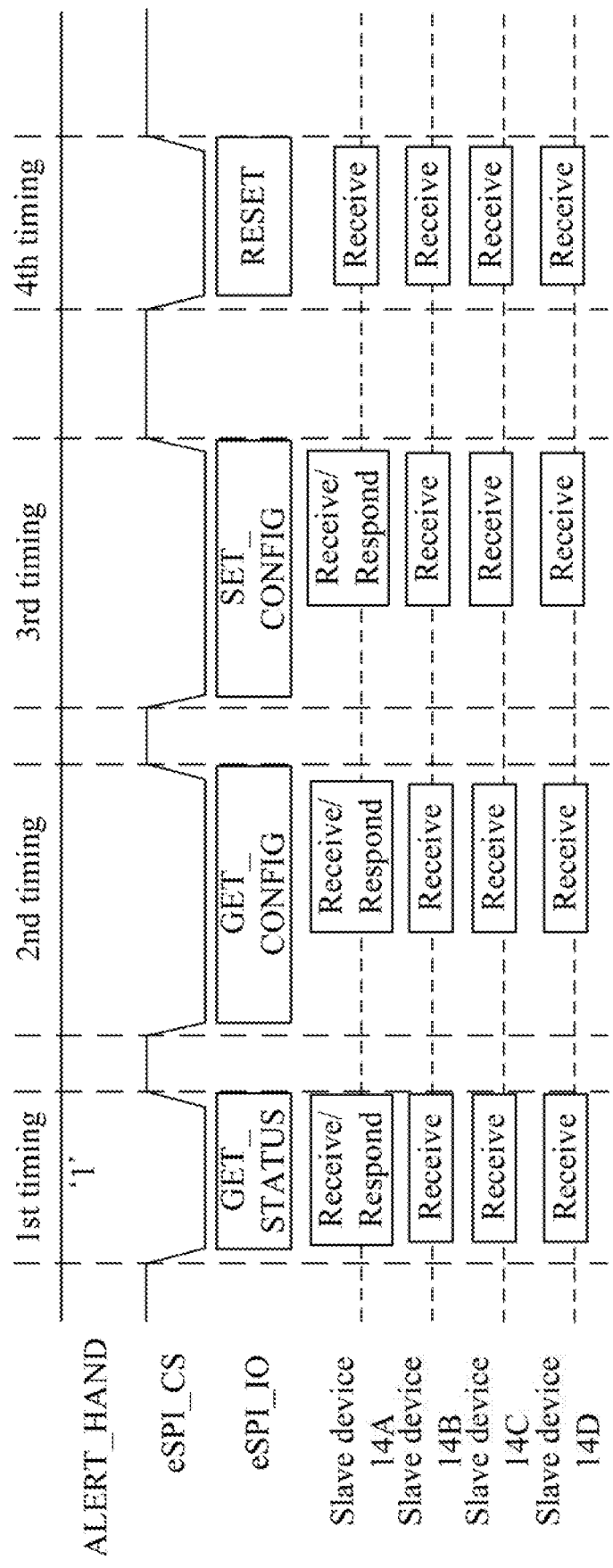
FIG. 3 is a diagram of the waveforms of the chip select signal line, the input and output signal line and the alert handshake control line and the corresponding operations performed by the slave devices under different timings in an embodiment of the present disclosure.

Reference is now made to FIG. 2 and FIG. 3 at the same time. FIG. 3 is a diagram of the waveforms of the chip select signal line eSPI_CS, the input and output signal line eSPI_IO and the alert handshake control line ALERT_HAND and the corresponding operations performed by the slave devices 14A-14D under different timings in an embodiment of the present disclosure.

When the bus system 1 is activated, the master device 10 and the slave devices 14A-14D perform the steps outlined below.

As illustrated in the first timing in FIG. 3 the master device 10 switches the chip select signal line eSPI_CS from a first level voltage to a second level voltage, so as to select one of the slave devices 14A-14D. The master device 10 does not know that there are a multiple of slave devices 14A-14D connected on the chip select signal line eSPI_CS, so the master device 10 is in communication with all of the slave devices 14A-14D first. In the present embodiment, the first level voltage is a high voltage level and the second level voltage is a low voltage level. The master device 10 further transmits a status-retrieving signal GET_STATUS through the input and output signal line eSPI_IO to confirm whether the slave devices 14A-14D exist. In an embodiment, the input and output signal line eSPI_IO actually includes four sub signal lines to perform the command and data transmission. The four sub signal lines are expressed as eSPI_IO[3:0].

Under such a condition, the slave device 14 that serves as the primary slave device receives the status-retrieving signal GET_STATUS (command) and responds (labeled as receive/respond in FIG. 3) to the master device 10, so that the master device 10 knows existence of the slave device. The slave devices 14B-14D that serve as the secondary slave devices only receive the status-retrieving signal GET_STATUS (labeled as receive in FIG. 3) without performing response. As a result, the slave device 14A represents the whole slave devices 14A-14D to respond the master device 10.

In other words, for the master device 10, it still performs communication with the slave devices 14A-14D in the one-to-one mechanism. For the slave devices 14A-14D, the arbitration mechanism is used to select one of the slave devices 14A-14D to perform communication with the master device 10. In an embodiment, after the communication in this stage is finished, the chip select signal line eSPI_CS is switched from the second level voltage back to the first level voltage.

Subsequently, as illustrated in the second timing in FIG. 3, the master device 10 switches the chip select signal line eSPI_CS from the first level voltage to the second level voltage again to select the slave devices 14A-14D. The master device 10 transmits a configuration-retrieving signal GET_CONFIG through the input and output signal line eSPI_IO to retrieve the configuration of selected one of the slave devices 14A-14D.

Under such a condition, the slave device 14A that serves as the primary slave device receives the configuration-retrieving signal GET_CONFIG through the input and output signal line eSPI_IO and performs response (labeled as receive/respond in FIG. 3). The content of the response may include such as, but not limited to the data transmission formats that the slave devices 14A-14D support. The data transmission formats may include such as but not limited to the data width and the transmission speed. For example, the data width can be such as, but not limited to 1, 2 or 4 bits. The operation clock may be such as, but not limited to 20, 33, 50 and 66 mega-hertz (MHz).

The slave devices 14B-14D that serve as the secondary slave devices only receive the configuration-retrieving signal GET_CONFIG (labeled as receive in FIG. 3) without performing response. As a result, the slave device 14A represents the whole slave devices 14A-14D to respond the master device 10. In an embodiment, after the communication in this stage is finished, the chip select signal line eSPI_CS is switched from the second level voltage back to the first level voltage.

Subsequently, as illustrated in the third timing in FIG. 3, the master device 10 switches the chip select signal line eSPI_CS from the first level voltage to the second level voltage again to select one of the slave devices 14A-14D. The master device 10 transmits a configuration-setting signal SET_CONFIG through the input and output signal line eSPI_IO to set the slave devices 14A-14D according to the configuration supported by the slave devices 14A-14D. For example, the master device 10 can set the data transmission formats having the 2-bit data width and the operation clock of 33 MHz to perform communication with the slave devices 14A-14D.

Under such a condition, the slave device 14A that serves as the primary slave device receives the configuration-setting signal SET_CONFIG through the input and output signal line eSPI_IO, performs the configuration setting and performs response (labeled as "receive/respond" in FIG. 3). The response represents the completion of the configuration setting and that the slave device 14A is able to perform communication with the master device 10 according to such a configuration setting.

The slave devices 14B-14D that serve as the secondary slave devices only receive the configuration-setting signal SET_CONFIG (labeled as receive in FIG. 3) and perform the configuration setting without performing response. As a result, the slave device 14A represents the whole slave devices 14A-14D to response the master device 10. In an embodiment, after the communication in this stage is finished, the chip select signal line eSPI_CS is switched from the second level voltage back to the first level voltage.

In another embodiment, the master device 10 can reset the slave devices 14A-14D during operation or when the system is restarted from a power-off status or a sleep status. Under such a condition, as illustrated in the fourth timing in FIG. 3, the master device 10 switches the chip select signal line eSPI_CS from the first level voltage to the second level voltage again to select one of the slave devices 14A-14D. The master device 10 then transmits a reset signal RESET through the input and output signal line eSPI_IO.

Under such a condition, the slave device 14A that serves as the primary slave device receives the reset signal RESET through the input and output signal line eSPI_IO and resets (labeled as receive in FIG. 3). In an embodiment, since the slave devices 14A-14D still needs to perform the steps of receiving the inquiring of existence, the inquiring of configuration and the retrieving of configuration after reset, the slave devices 14A-14D do not need to respond to the reset signal RESET. In an embodiment, after the communication in this stage is finished, the chip select signal line eSPI_CS is switched from the second level voltage back to the first level voltage.

It is appreciated that in different embodiments, the reset mechanism can be performed by transmitting the reset signal RESET through the input and output signal line eSPI_IO as illustrated in the present embodiment, or by transmitting the reset signal RESET through the reset signal line eSPI_RST included in the bus 12 as illustrated in FIG. 2.

Besides, it is appreciated that in the present embodiment, the slave devices 14A-14D do not perform communication actively with the master device 10. Hence the alert handshake control line ALERT_HAND stays in the first level voltage.

Figure 4:
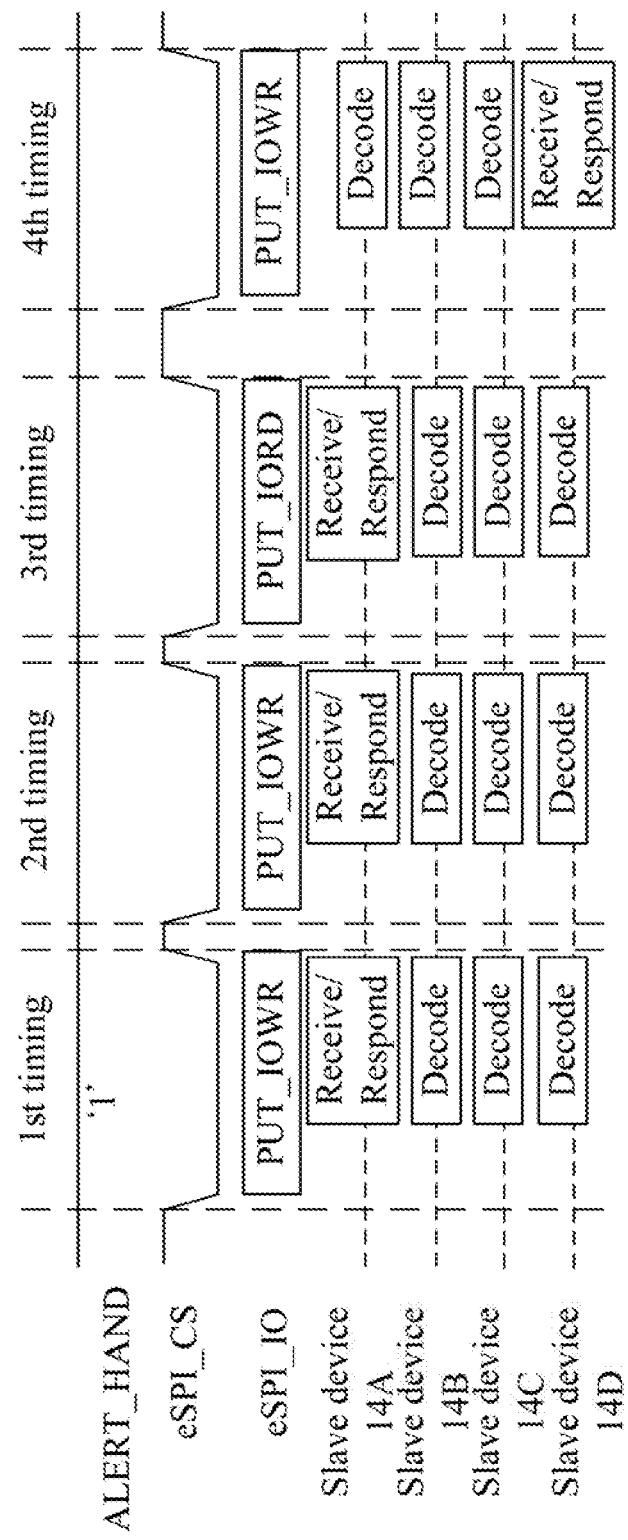
FIG. 4 is a diagram of the waveforms of the chip select signal line, the input and output signal line and the alert handshake control line and the corresponding operations performed by the slave devices under different timings in another embodiment of the present disclosure.

Reference is now made to FIG. 1 and FIG. 4 at the same time. FIG. 4 is a diagram of the waveforms of the chip select signal line eSPI_CS, the input and output signal line eSPI_IO and the alert handshake control line ALERT_HAND and the corresponding operations performed by the slave devices 14A-14D under different timings in another embodiment of the present disclosure.

When the bus system in operation, the master device 10 and the slave devices 14A-14D perform the steps outlined below.

As illustrated in the first timing in FIG. 4, the master device 10 switches the chip select signal line eSPI_CS from the first level voltage to the second level voltage to select one of the slave devices 14A-14D. The master device 10 can transmit the data access signal, such as the data write signal PUT_IOWR, through the input and output signal line eSPI_IO according to a target address, based on such as, but not limited the requirement of the processing module 10. In an embodiment, the master device 10 writes data 87h according to the target address corresponding to the address section 2Eh.

Under such a condition, the slave device 14A corresponding to the address section receives and decodes the data write signal PUT_IOWR, writes the data therein and performs response (labeled as receive/respond in FIG. 4). The slave devices 14B-14D that do not correspond to the address section receive and decode the data write signal PUT_IOWR without writing data and without performing response. In an embodiment, after the communication in this stage is finished, the chip select signal line eSPI_CS is switched from the second level voltage back to the first level voltage.

As illustrated in the second timing in FIG. 4, the master device 10 switches the chip select signal line eSPI_CS from the first level voltage to the second level voltage again to select one of the slave devices 14A-14D. The master device 10 can transmit the data access signal, such as the data write signal PUT_IOWR, through the input and output signal line eSPI_IO according to a target address, based on such as, but not limited the requirement of the processing module 10. In an embodiment, the master device 10 writes data 20h according to the target address corresponding to the address section 2Eh.

Under such a condition, the slave device 14A corresponding to the address section receives and decodes the data write signs PUT_IOWR, writes the data therein and performs response (labeled as receive/respond in FIG. 4). The slave devices 14B-14D, which do not correspond to the address section, receive and decode the data write signal PUT_IOWR without writing data and without performing response. In an embodiment, after the communication in this stage is finished, the chip select signal line eSPI_CS is switched from the second level voltage back to the first level voltage.

As illustrated in the third timing in FIG. 4, the master device 10 switches the chip select signal line eSPI_CS from the first level voltage to the second level voltage again to select one of the slave devices 14A-14D. The master device 10 can transmit the data access signal, such as the data read signal PUT_IORD, through the input and output signal line eSPI_IO according to a target address, based on such as, but not limited the requirement of the processing module 10. In an embodiment, the master device 10 reads data according to the target address corresponding to the address section 2Fh.

Under such a condition, the slave device 14A corresponding to the address section receives and decodes the data read signal PUT_IORD to read the data therefrom, and performs response (labeled as receive/respond in FIG. 4). The slave devices 14B-14D, which do not correspond to the address section, receive and decode the data read signal PUT_IORD without reading data and without performing response. In an embodiment, after the communication in this stage is finished, the chip select signal line eSPI_CS is switched from the second level voltage back to the first level voltage.

As illustrated in the fourth timing in FIG. 4, the master device 10 switches the chip select signal line eSPI_CS from the first level voltage to the second level voltage again to select one of the slave devices 14A-14D. The master device 10 can transmit the data access signal, such as the data write signal PUT_IOWR, through the input and output signal line eSPI_IO according to a target address, based on such as, but not limited the requirement of the processing module 10. In an embodiment, the master device 10 writes data according to the target address corresponding to the address 2E8h.

In an embodiment, the slave device 14D has a function located at the address 0x2E8h. As a result, the slave device 14D corresponding to the address section receives and decodes the data write signal PUT_IOWR writes the data therein and performs response (labeled as receive/respond in FIG. 4). The slave devices 14A-14C, which do not correspond to the address section, receive and decode the data write signal PUT_IOWR without writing data and without performing response. In an embodiment, after the communication in this stage is finished, the chip select signal line eSPI_CS is switched from the second level voltage back to the first level voltage.

It is appreciated that the data accesses in the timings mentioned above are independent embodiments. In practical applications, the master device 10 can access data according to different addresses as desired without following the order mentioned above. Under such a data access mode, all of the slave devices 14A-14D receive and decode the data access signal from the master device 10, but only the slave device corresponding to the address operates the data access and performs response. Further, in the present embodiment, the slave devices 14A-14D do not perform communication actively with the master device 10. Hence, the alert handshake control line ALERT_HAND stays in the first level voltage.

Figure 5:
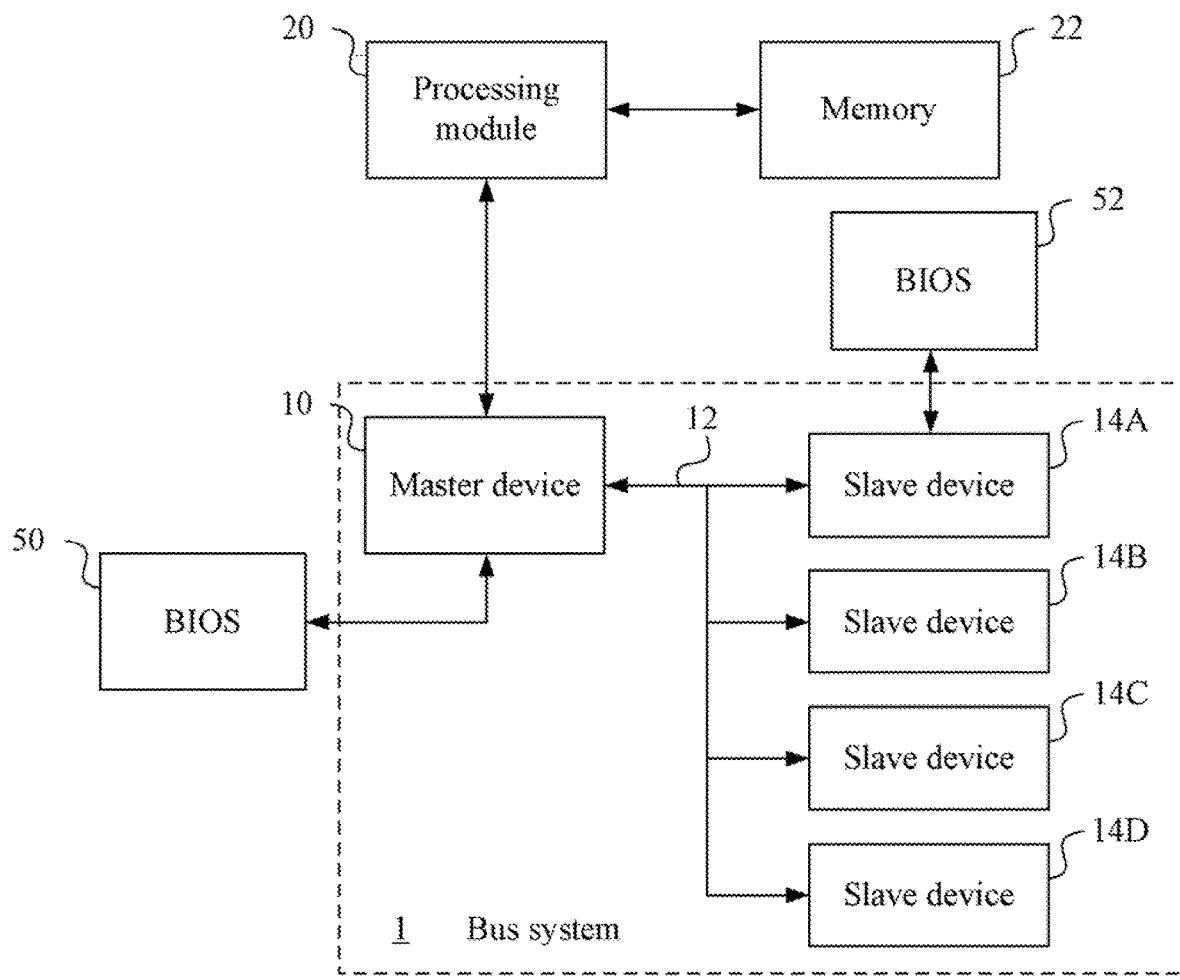
FIG. 5 is a block diagram of a bus system in an embodiment of the present disclosure.

Reference is now made to FIG. 5. FIG. 5 is a block diagram of a bus system 1 in an embodiment of the present disclosure. Similar to the bus system illustrated in FIG. 1, the bus system 1 in FIG. 5 includes the master device 10, the bus 12 and the slave devices 14A-14D. In the present embodiment, the master device 10 is further electrically connected to a basic input/output system (BIOS) 50. The slave device 14A that serves as the primary slave device is further electrically connected to a BIOS 52.

The master device 10 and the slave devices 14A-14D perform the steps outlined below.

In an embodiment, similar to the data access method described in FIG. 4, the master device 10 can read the data in the BIOS 52 through the primary slave device 14A by using the chip select signal line eSPI_CS to perform selection and by using the input and output signal line eSPI_IO to transmit data access signal. Similarly, under such a condition, all the slave devices 14A-14D receive and decode the access signal from the master device 10. However, only the primary slave device 14A performs the corresponding operations and performs response. In a practical usage scenario, the master device 10 can read data from the backup BIOS 52 under the request of the processing module 20 to perform system activation and setting when using the BIOS 50 to perform system activation and setting is not possible.

In an embodiment, the primary slave device 14A can submit request to the master device 10 to access the BIOS 50 through the bus 12 and the master device 10. In an embodiment, by using such a data access method, the data in the BIOS 50 can be backup in the BIOS 52, or the data in the BIOS 52 can be used to restore the data in the BIOS 50.

Figure 6:
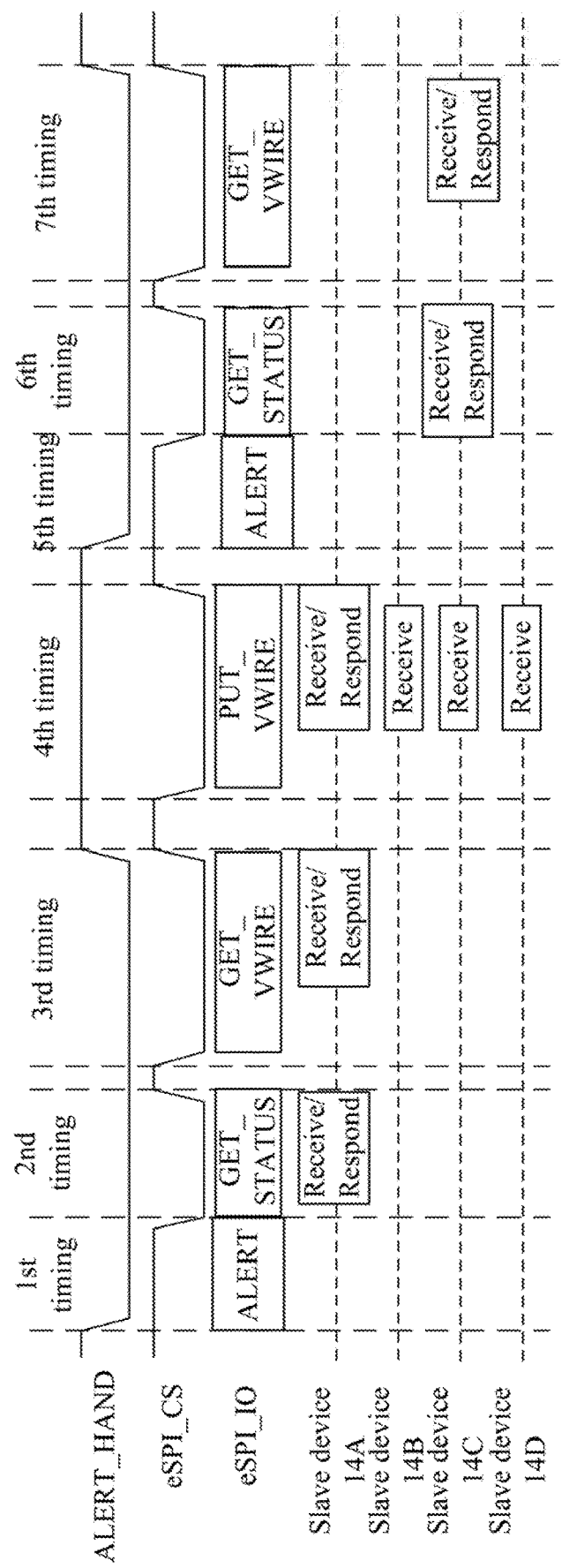
FIG. 6 is a diagram of the waveforms of the chip select signal line, the input and output signal line and the alert handshake control line and the corresponding operations performed by the slave devices under different timings in another embodiment of the present disclosure.

Reference is now made to FIG. 2 and FIG. 6 at the same time. FIG. 6 is a diagram of the waveforms of the chip select signal line eSPI_CS the input and output signal line eSPI_IO and the alert handshake control line ALERT_HAND and the corresponding operations performed by the slave devices 14A-14D under different timings in another embodiment of the present disclosure.

During the operation of the bus system 1, the master device 10 and the slave devices 14A-14D performs the steps outlined below.

In an embodiment, the slave device 14A can be any functional module and can generate an event message supposed to be transmitted to the master device 10 after the slave device 14A completes a specific function. As a result, the slave device 14A needs to actively perform communication with the master device 10.

As illustrated in the first tinning in FIG. 6, the slave device 14A switches the alert handshake pin 146A from a first level voltage to a second level voltage to further switch the alert handshake control line ALERT_HAND from the first level voltage to the second level voltage. The slave device 14A further transmits an event-alert signal ALERT to the master device 10 through the input output signal line eSPI_IO. The event-alert signal ALERT stands for a request signal that the slave device 14A requests the master device 10 to perform communication therewith. Under such a condition, if the other slave devices 14B-14D also have the event message supposed to be transmitted to the master device 10, the event message is stored and not transmitted until the slave devices 14B-14D takes the authority to communicate with the mater device 10.

As illustrated in the second timing in FIG. 6, the master device 10 witches the chip select signal line eSPI_CS from the first level voltage to the second level voltage again to select one of the slave devices 14A-14D. In the present embodiment, the first level voltage is a high voltage level and the second level voltage is a low voltage level. The master device 10 further transmits a status-retrieving signal GET_STATUS through the input and output signal line eSPI_IO to inquire the statuses of the slave devices 14A-14D.

Under such a condition, the slave device 14A, which is the event-alert slave device taking the authority, receives the status-retrieving signal GET_STATUS and performs response (labeled as receive/respond in FIG. 6) to notify the master device 10 that there is information supposed to be transmitted to the master device 10. The other slave devices 14B-14D do not receive the status-retrieving signal GET_STATUS and do not perform response either. In an embodiment, after the communication in this stage is finished, the chip select signal line eSPI_CS is switched from the second level voltage back to the first level voltage.

As illustrated in the third timing in FIG. 6, the master device 10 switches the chip select signal line eSPI_CS from the first level voltage to the second level voltage again to select one of the slave devices 14A-14D. The master device 10 further transmits an vent-retrieving signal GET_VWIRE through the input and output signal line eSPI_IO to retrieve the event message of the slave device 14A.

Under such a condition, the slave device 14A receives the event-retrieving signal GET_VWIRE and performs response (labeled as receive/respond in FIG. 6). The slave devices 14B-14D do not receive the event-retrieving signal GET_VWIRE and do not perform response either. In an embodiment, after the communication in this stage is finished, the chip select signal line eSPI_CS switches from the second level voltage back to the first level voltage. After the slave device 14A transmits the event message to the master device 10, and the communication with the master device 10 is finished and the chip select signal line eSPI_CS is switched from the second level voltage back to the first level voltage, the slave device 14A switches the alert handshake pin 146A from the second level voltage to the first level voltage to further switch the alert handshake control line ALERT_HAND from the second level voltage to the first level voltage. The authority of the slave device 14A to occupy and control the communication with the master device 10 is finished and released.

As illustrated in the fourth timing in FIG. 6, the raster device 10 switches the chip select signal line eSPI_CS from the first level voltage to the second level voltage again to select one of the slave devices 14A-14D. The master device 10 further transmits a system event signal PUT_VWIRE through the input and output signal line eSPI_IO to transmit the message of various kinds of system events in, the computer system to the slave devices 14A-14D. In an embodiment, the message of the system event may be such as, but not limited to the power status of the whole system or a specific module within the system. The power status may include the power status under different operation modes such as, but not limited to a sleep mode or a power-saving mode. Under such a condition, the slave devices 14A-14D do not perform communication actively with the master device 10. Hence, the alert handshake control line ALERT_HAND is kept in the first level voltage.

Under such a condition the slave device 14 that serves as the primary slave device receives the system event signal PUT_VWIRE and performs response (labeled as receive/respond in FIG. 6) to notify the master device 10 that the message of the system event is received. The slave devices 14B-14D that serve as the secondary slave devices only receive the system event signal PUT_VWIRE (labeled as receive in FIG. 6) without performing response. As a result, the slave device 14A represents the whole slave devices 14A-14D to response the master device 10. In an embodiment, after the communication in this stage is finished, the chip select signal line eSPI_CS is switched from the second level voltage back to the first level voltage.

In an embodiment, the slave device 14C can be such as, but not limited to a mouse to receive an event message supposed to be transmitted to the master device 10, such as but not limited to a user input received by the mouse. As a result, the slave device 14C needs to perform communication with the master device 10 actively.

As illustrated in the fifth timing in FIG. 6, the slave device 14C switches the alert handshake pin 146C from a first level voltage to a second level voltage to further switch the alert handshake control line ALERT_HAND from the first level voltage to the second level voltage. The slave device 14C further transmits an event-alert signal ALERT to the master device 10 through the input output signal line eSPI_IO. Under such a condition if the other slave devices 14A, 14B and 14D have the event message supposed to be transmitted to the master device 10, the event message is stored and not transmitted until the slave devices 14A, 14B and 14D takes the authority to communication with the master device 10.

As illustrated in the sixth timing in FIG. 6, the master device 10 switches the chip select signal line eSPI_CS from the first level voltage to the second level voltage again to select one of the slave devices 14A-14D. The master device 10 further transmits a status-retrieving signal GET_STATUS through the input and output signal line eSPI_IO to inquire the statuses of the slave devices 14A-14D.

Under such a condition, the slave device 14C, which is the event-alert slave device taking the authority, receives the status-retrieving signal GET_STATUS and performs response (labeled as receive/respond in FIG. 6) to notify the master device 10 that there is information supposed to be transmitted to the master device 10. The other slave devices 14A, 14B and 14D do not receive the status-retrieving signal GET_STATUS and do not perform response either. In an embodiment, after the communication in this stage is finished, the chip select signal line eSPI_CS is switched from the second level voltage back to the first level voltage.

As illustrated in the seventh timing in FIG. 6, the master device 10 switches the chip select signal line eSPI_CS from the first level voltage to the second level voltage again to select one of the slave devices 14A-14D. The master device 10 further transmits an event-retrieving signal GET_VWIRE through the input and output signal line eSPI_IO to retrieve the event message of the slave device 14C.

Under such a condition, the slave device 14C receives the event-retrieving signal GET_VWIRE and performs response (labeled as receive/respond in FIG. 6). The slave devices 14A, 14B and 14D do not receive the event-retrieving signal GET_VWIRE and do not perform response either. In an embodiment, after the communication in this stage is finished, the chip select signal line eSPI_CS is switched from the second level voltage back to the first level voltage. After the slave device 14C transmits the event message to the master device 10, and the communication with the master device 10 is finished and the chip select signal line eSPI_CS is switched from the second level voltage back to the first level voltage, the slave device 14C switches the alert handshake pin 146C from the second level voltage to the first level voltage to further switch the alert handshake control line ALERT_HAND from the second level voltage to the first level voltage. The authority of the slave device 14C to occupy and control the communication with the master device 10 is finished and released.

It is appreciated that the communications in the first to the third, the fourth, the fifth and the seventh timings mentioned above are independent embodiments. In practical applications, the communication can be performed in any order. Under such a data access mode, when the slave devices 14A-14D want to perform communication actively with the master device 10, one of the slave devices 14A-14D can take the authority by using the alert handshake pins 146A-146D such that only one of the slave devices 14A-14D performs communication with the master device 10 in a single time.

Figure 7:
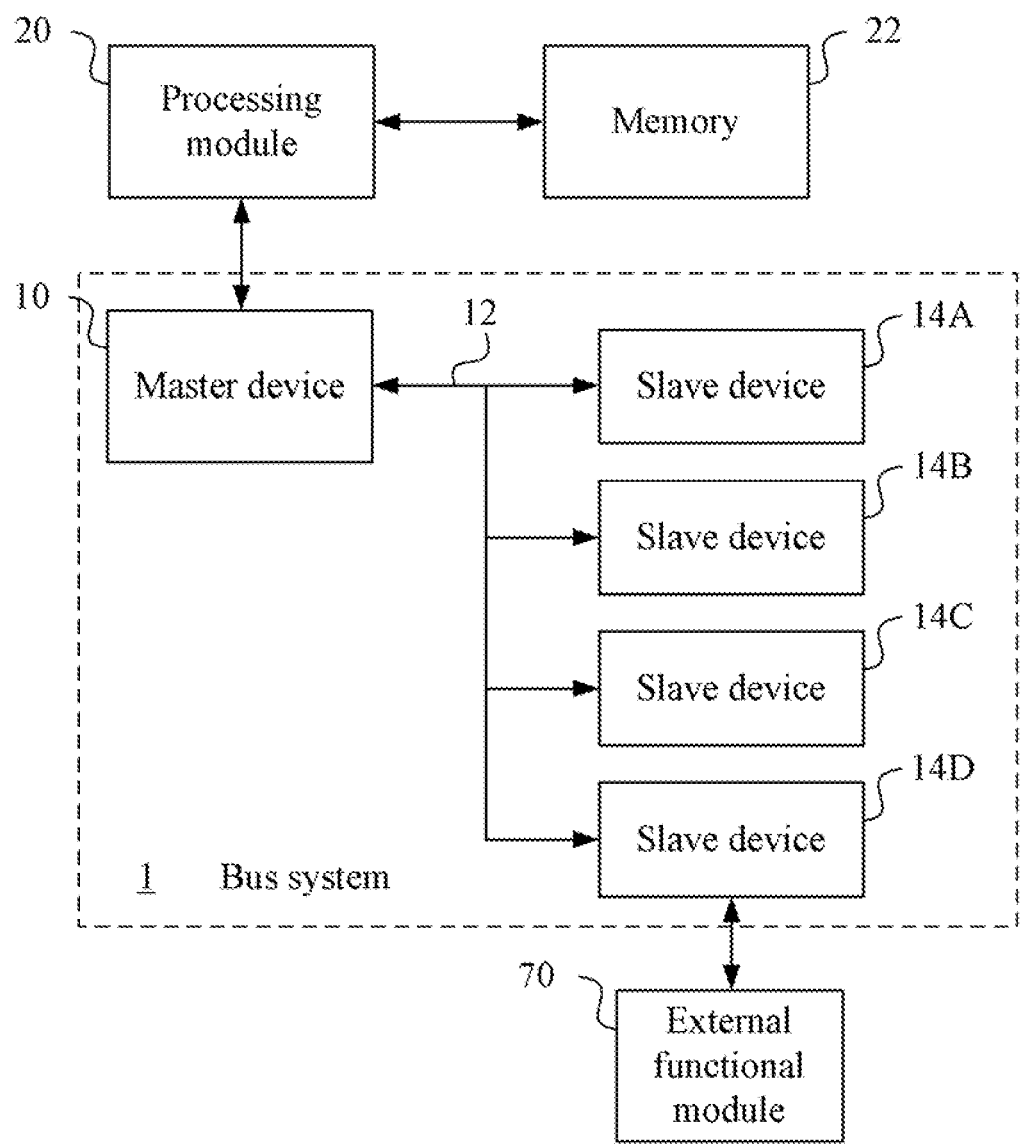
FIG. 7 is a block diagram of a bus system in an embodiment of the present disclosure.
Figure 8:
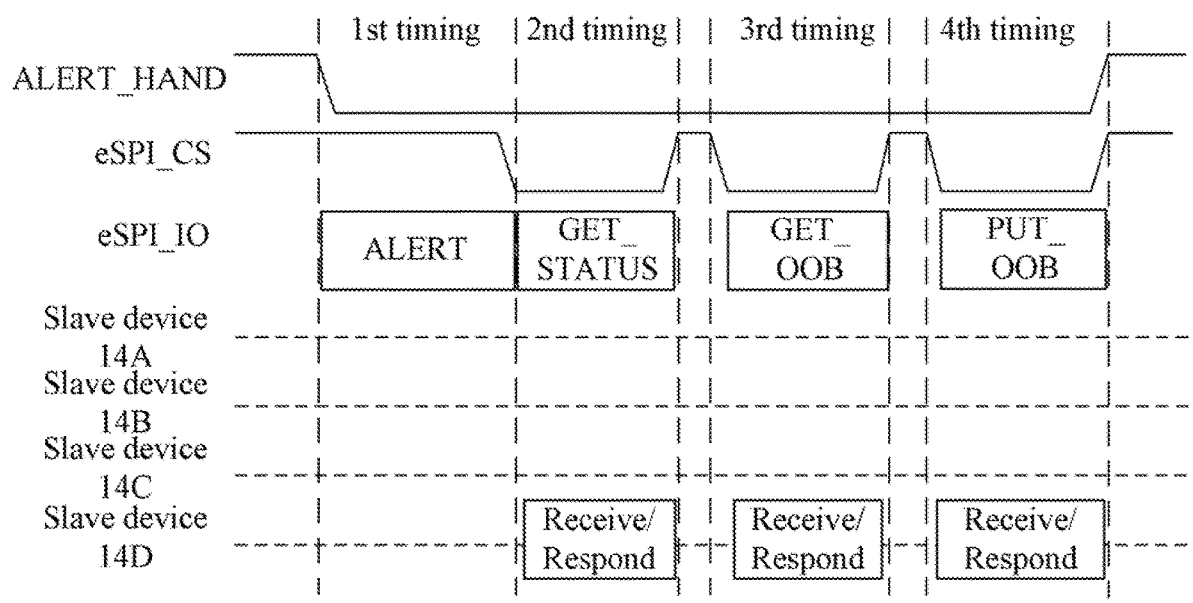
FIG. 8 is a diagram of the waveforms of the chip select signal line, the input and output signal line and the alert handshake control line and the corresponding operations performed by the slave devices under different timings in another embodiment of the present disclosure.

Reference is now made to FIG. 7 and FIG. 8 at the same time. FIG. 7 is a block diagram of the system bus 1 in an embodiment of the present disclosure. Similar to the bus system 1 illustrated in FIG. 1, the bus system 1 in FIG. 7 includes the master device 10, the bus 12 and the slave devices 14A-14D. In the present embodiment, the master device 10 is further electrically connected to an external functional module 70. The external functional module 70 can be such as, but not limited to a fan module. In an embodiment, the external functional module 70 can generate information that includes such as, but not limited to temperature or fan speed.

FIG. 8 is a diagram of the waveforms of the chip select signal line eSPI_CS, the input and output signal line eSPI_IO and the alert handshake control line ALERT_HAND and the corresponding operations performed by the slave devices 14A-14D under different timings in another embodiment of the present disclosure.

In the present embodiment, any one of the slave devices 14A-14D can use the alert handshake pins 146A-146D and the alert handshake control line ALERT_HAND to transmit an alert message to retrieve the temperature information through the master device 10 and further control the external functional module 70.

As a result, during the operation of the bus system 1, the master device 10 and the slave devices 14A-14D perform the steps outlined below.

As illustrated in the first timing in FIG. 8, the slave device 14D switches the alert handshake pin 146D from a first level voltage to a second level voltage to further switch the alert handshake control line ALERT_HAND from the first level voltage to the second level voltage. The slave device 14D further transmits an event-alert signal ALERT to the master device 10 through the input output signal line eSPI_IO. Under such a condition, if the other slave devices 14A-14C have the event message supposed to be transmitted to the master device 10, the event message is stored and not transmitted until one of the slave devices 14A-14C takes the authority to communicate with the mater device 10.

As illustrated in the second timing in FIG. 8, the master device 10 switches the chip select signal line eSPI_CS from the first level voltage to the second level voltage according to the event-alert signal ALERT to select one of the slave devices 14A-14D. In the present embodiment the first level voltage is a high voltage level and the second level voltage is a low voltage level. The master device 10 further transmits a status-retrieving signal GET_STATUS through the input and output signal line eSPI_IO to inquire the status of one of the slave devices 14A-14D.

Under such a condition, the slave device 14D, which is the event-alert slave device taking the authority, receives the status-retrieving signal GET_STATUS and performs response (labeled as receive/response in FIG. 8) to notify the master device 10 that the slave device 14D wants to access the data from the master device 10. The other slave devices 14A-14C do not receive the status-retrieving signal GET_STATUS and do not perform response either. In an embodiment, after the communication in this stage is finished, the chip select signal line eSPI_CS is switched from the second level voltage back to the first level voltage.

As illustrated in the third timing in FIG. 8, the master device 10 switches the chip select signal line eSPI_CS from the first level voltage to the second level voltage again to select one of the slave devices 14A-14D. The master device 10 further transmits a data inquiring signal GET_OOB through the input and output signal line eSPI_IO to inquire the type and the content of the data that the slave device 14D wants to access.

Under such a condition, the slave device 14D receives the data-inquiring signal GET_OOB and performs response (labeled as receive/respond in FIG. 8) to notify the master device 10 that the slave device 14D wants to access the temperature information from the master device 10. The slave devices 14A-14C do not receive the data-inquiring signal GET_OOB and do not perform response either. In an embodiment, after the communication in this stage is finished, the chip select signal line eSPI_CS is switched from the second level voltage back to the first level voltage.

As illustrated in the fourth timing in FIG. 8, after the master device 10 retrieves the temperature information, the master device 10 further switches the chip select signal line eSPI_CS from the first level voltage to the second level voltage again to select one of the slave devices 14A-14D. The master device 10 further transmits a data signal PUT_OOB through the input and output signal line eSPI_IO to transmit the temperature information thereof to the slave device 14D.

Under such a condition, the slave device 14D, which is the event-alert slave device taking the authority, receives the data signal PUT_OOB and performs response (labeled as receive/responce in FIG. 8) to receive the temperature information in the master device 10. The slave devices 14A-14C do not receive the data s goal PUT_OOB and do not perform response either.

In an embodiment, after the communication in this stage is finished, the chip select signal line eSPI_CS is switched from the second level voltage back to the first level voltage. After the slave device 14D receives information from the master device 10, and the communication with the master device 10 is finished and the chip select signal line eSPI_CS is switched from the second level voltage back to the first level voltage, the slave device 14D switches the alert handshake pin 146D from the second level voltage to the first level voltage to further switch the alert handshake control line ALERT_HAND from the second level voltage to the first level voltage. The authority of the slave device 14D to occupy and control the communication with the master device 10 is finished and released.

In an embodiment, when the external functional module 70 is the fan control module mentioned above, the slave device 14D can further use the temperature information to control the fan speed to accomplish object of heat-dissipating.

Under such a data access mode, when the slave devices 14A-14D want to perform communication actively with the master device 10, one of the slave devices 14A-14D can take the authority by using the alert handshake pins 146A-146D such that only one of the slave devices 14A-14D performs communication with the master device 10 in a single time.

As a result, by using the method described above, though the master device 10 in the bus system 1 still operates in the one-to-one communication mechanism, one of the slave devices 14A-14D can use the arbitration mechanism to perform communication therewith such that the expandability of the bus system 1 is increased.

It is appreciated that the number of the slave devices 14A-14D described above can be different in various usage scenarios and is not limited to four. The voltages V1, V2 and V3 described above can have values that are identical or different from each other, and are not limited to a single combination of values. Moreover, the high and low relation of the first level voltage and the second level voltage can also be different in various usage scenario and is not limited to the examples in the embodiments in the specification describe above.

As a result, in an embodiment, the advantage of the present disclosure is that though the master device in the bus system still operates in the one-to-one communication mechanism, one of the slave devices can use the arbitration mechanism to perform communication therewith such that the expandability of the bus system is increased.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A bus system comprising: a master device; a bus comprising a chip select signal line and an input output signal line which are both connected to the master device; and a plurality of slave devices electrically connected to the master device through the bus and assigned to have a plurality address sections different from each other, and comprising only one primary slave device and at least one secondary slave device; wherein the master device is able to trigger the chip select signal line, to start a one-to-one communication through the input output signal line; wherein based on a control mechanism an event-alert slave device of the plurality of slave devices takes an authority to communicate with the master device; wherein when the master device triggers the chip select signal line to start the one-to-one communication through the input output signal line and none of the plurality of slave devices wants to actively communicate with the master device, the only one primary slave device is in charge of response to the master device, wherein each of the slave devices further comprises an alert handshake pin and the alert handshake pins of the plurality of slave devices are electrically connected to an alert handshake control line, wherein in the control mechanism, the master device and the plurality of slave devices perform steps of: switching the alert handshake pin from a first level voltage to a second level voltage to further switch the alert handshake control line from the first level voltage to the second level voltage, and transmitting an event-alert signal through the bus by the event-alert slave device, transmitting a status-retrieving signal through the bus by the master device according to the event-alert signal, receiving the status-retrieving signal and performing response to the master device through the bus by the event-alert slave device, transmitting an event-retrieving signal through the bus by the master device, and receiving the event-retrieving signal and performing response to the master device through the bus by the event-alert slave device.

2. The bus system of claim 1, wherein the bus is an enhanced serial peripheral interface (eSPI) bus;
wherein when the bus system is activated, the only one primary slave device is in charge of response to the master device in an initial state, and after the initial state, any one of the plurality of slave devices is able to actively communicate with the master device.

3. The bus system of claim 2, wherein when the master device switches the chip select signal line from the first level voltage to the second level voltage to trigger the one-to-one communication, and transmits signals through the input output signal line, the one of the plurality of slave devices responds to the master device by making the other of the plurality of slave devices not respond to the master device according to the control mechanism.

4. The bus system of claim 3, wherein after making the other of the plurality of slave devices not respond to the master device according to the control mechanism, the one of the plurality of slave devices transmits the event-alert signal to the master device through the input output signal line, to request communication.

5. The bus system of claim 1, wherein each of the slave devices comprises a primary and secondary determination pin, wherein the slave device having the primary and secondary determination pin which receives the first level voltage is set to be the primary slave device; and
the other slave device having the primary and secondary determination pin which receives the second level voltage different from the first level voltage is set to be the secondary slave device.

6. The bus system of claim 1, wherein each of the slave devices comprises at least one address section selection pin and at least one address entry selection pin respectively receive one of the first level voltage and the second level voltage different from each other, the address sections are assigned according to a combination of the first level voltage and/or the second level voltage received by the address section selection pin and the address entry selection pin of the slave devices.

7. The bus system of claim 6, wherein the response through the bus performed by the primary slave device to the configuration-retrieving signal at least comprises a data transmission format of the primary slave device and the secondary slave device.

8. The bus system of claim 1, wherein the master device and the slave devices perform steps of:
transmitting a reset signal through the bus by the master device; and
performing reset by the primary slave device and the secondary slave device without performing response.

9. The bus system of claim 1, wherein the master device and the slave devices perform steps of:
transmitting a data access signal through the bus according to a target address by the master device; and
decoding the data access signal by the primary slave device and the secondary slave device to determine a corresponding address section of the address sections corresponding to the target address and performing response to the master device through the bus by one of the primary slave device and the secondary slave device having the corresponding address section.

10. The bus system of claim 1, further comprising a first basic input/output system (BIOS) electrically connected to the primary slave device, and the master device and the plurality of slave devices perform steps of:
transmitting a first BIOS access signal through the bus by the master device; and
decoding the first BIOS access signal by the primary slave device and the secondary slave device, accessing the first BIOS by the primary slave device and performing response to the master device through the bus by the primary slave device.

11. The bus system of claim 10, further comprising a second BIOS electrically connected to the master device, wherein the primary slave device accesses the second BIOS through the bus and the master device.

12. The bus system of claim 11, wherein the primary slave device writes the data in the first BIOS to the second BIOS through the bus and the master device.

13. The bus system of claim 1, wherein the master device and the plurality of slave devices perform steps of:
- transmitting a system event signal through the bus by the master device; and
- receiving the system event signal by the primary slave device and the secondary slave device and performing response to the master device through the bus by the primary slave device.

14. The bus system of claim 1, wherein when the bus system is activated, the master device and the slave devices perform steps of:
- transmitting the status-retrieving signal through the bus by the master device to confirm whether the slave devices exist;
- receiving the status-retrieving signal by the primary slave device and the secondary slave device, and transmitting a status-response signal in response to the status-retrieving signal through the bus only by the primary slave device;
- transmitting a configuration-retrieving signal through the bus by the master device;
- receiving the configuration-retrieving signal by the primary slave device and the secondary slave device, and performing response to the configuration-retrieving signal through the bus only by the primary slave device;
- transmitting a configuration-setting signal through the bus by the master device; and
- receiving the configuration-setting signal by the primary slave device and the secondary slave device, performing a configuration setting according to the configuration-setting signal by the primary slave device and the secondary slave device and performing response to the configuration-retrieving signal through the bus only by the primary slave device.

15. The bus system of claim 14, wherein after receiving the status-retrieving signal and performing response to the master device through the bus by the event-alert slave device, the master device and the plurality of slave devices further perform steps of:
- transmitting a data access confirming signal through the bus by the master device;
- receiving the data access confirming signal and performing response to the master device through the bus by the event-alert slave device;
- transmitting a data signal through the bus by the master device; and
- receiving the data signal and performing response to the master device through the bus by the event-alert slave device.

* * * * *